Feb. 27, 1934.　　M. D. SQUIERS　　1,949,087
INSULATING MATERIAL
Filed June 20, 1932
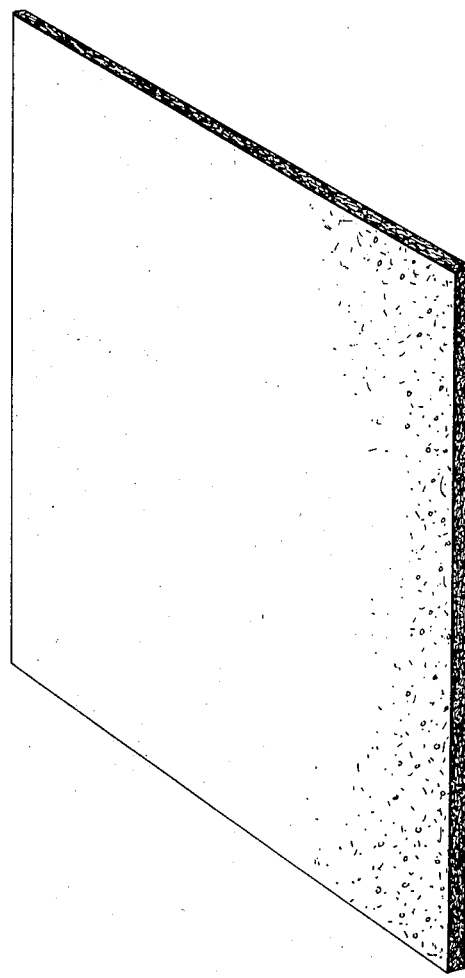
INVENTOR
Merrill D. Squiers
BY
ATTORNEYS Patented Feb. 27, 1934

1,949,087

UNITED STATES PATENT OFFICE 1,949,087

INSULATING MATERIAL

Merrill D. Squiers, Kalamazoo, Mich.

Application June 20, 1932. Serial No. 618,162

4 Claims. (Cl. 92—21)

The main objects of this invention are:

First, to provide a satisfactory water-proof insulating material for refrigerators, buildings, and the like.

Second, to provide an insulating material characterized by the following highly desirable properties: water-proof, uniformly porous or cellular, fairly dense, nailable, hard, self-supporting, rigid, moldable in any desired shape, capable of being readily cut or sawed, a relatively high melting point, and a relatively high insulating value.

Third, to provide an insulating material that is economical to manufacture and efficient in operation.

Fourth, to provide an improved method of making insulating material possessing the desirable characteristics mentioned above.

Objects relating to details and economies of my invention will appear from the description to follow. The invention is defined and pointed out in the claims.

A specimen of my invention is illustrated in the accompanying drawing.

The single figure is a perspective view of a sheet of my improved insulating material.

In preparing my insulating material, the component parts are selected according to the following formula:

| | |
|---|---|
| Water | 1500 lbs. |
| Trisodium phosphate | 4½ lbs. |
| Mineral wool | 100 lbs. |
| Asphalt emulsion | 10 lbs. |

The water employed in the process should be softened or substantially free from lime. Water such as Kalamazoo city water is unsatisfactory without the addition of a softening agent such as trisodium phosphate, 4½ lbs. of trisodium phosphate being added to 1500 lbs. or 180 gallons of this particular water. If the water to be used is originally soft or free of lime, the use of a softening agent such as trisodium phosphate may be omitted.

The character of the material, so far as hardness is concerned, is controlled by the kind of emulsion used. I have found a satisfactory emulsion to be Barber's asphalt G—603, which contains 68% to 70% of asphalt. However, other asphalt emulsions may be employed, and if hard insulation is desired, that is, insulation hard enough to receive nails, Gilsonite emulsion may be used. 18% of Gilsonite added to 82% of Barber's asphalt G—603 gives a penetration of about 20, and Gilsonite emulsion G—610 35% plus 65% of Barber's asphalt G—603 gives a melting point of about 200 with a penetration of 5.

I prefer to use the following method in preparing the insulating material. About 100 lbs. of mineral wool is added to the soft water in the amount of about 1500 lbs., the mixture being thoroughly stirred until the mineral wool is dispersed therein, the object of the stirring being to avoid or eliminate clusters or lumps of the mineral wool. To this mixture is added about 10 lbs. of asphalt emulsion, the latter being thoroughly stirred into the mixture and the material then molded or felted by use of screen or other suitable means to produce the desired shape, such as sheets or otherwise. In the molding process, pressure is unnecessary, the mass being smoothed down to the desired thickness.

The product is not only waterproof, but highly porous or cellular, as illustrated by sheet 1 of the drawing. The material presents a fairly dense body which may be molded into any desired shape or may be made sufficiently hard to hold nails and the like. It may be readily cut or sawed, but is comparatively rigid and self-supporting. The material is highly satisfactory for refrigerators and similar devices where sweating or condensation is encountered, the material being waterproof and impervious to moisture.

By the term "mineral wool" as used in the following claims, I intend to include slag wool, rock wool and/or other similar diatomaceous silicates.

Having thus described my invention, what I claim as new and desire to secure by Letters Patent is:

1. The method of making insulating material, which comprises mixing 1500 lbs. of soft water and 100 lbs. of mineral wool, stirring into this mixture 10 lbs. of asphalt emulsion, and then molding the material to produce the desired shape.

2. The method of making insulating material, which comprises mixing soft water and mineral wool, stirring into this mixture asphalt emulsion, and then molding the material to produce the desired shape.

3. The method of making insulating material, which comprises adding mineral wool to soft water and stirring until all lumps of mineral wool are removed from the mixture, adding asphalt emulsion and stirring until thoroughly mixed, and then felting to produce a sheet of the product.

4. The method of making insulating material, which comprises thoroughly mixing soft water, mineral wool, and asphalt emulsion, and molding to the desired shape.

MERRILL D. SQUIERS.